United States Patent [19]

Bruce et al.

[11] Patent Number: 5,646,846
[45] Date of Patent: Jul. 8, 1997

[54] GLOBAL POSITIONING PLANTER SYSTEM

[75] Inventors: Douglas M. Bruce, Cedar Rapids; Allan L. Lorenc, Oelwein, both of Iowa

[73] Assignee: Rawson Control Systems, Oelwein, Iowa

[21] Appl. No.: 240,332

[22] Filed: May 10, 1994

[51] Int. Cl.$^6$ .................................................. G06F 7/70
[52] U.S. Cl. ............... 364/424.07; 221/211; 221/150 A; 340/609; 340/684; 340/539; 340/674; 111/200; 111/903; 364/449.7; 364/551.01; 364/555
[58] Field of Search ............... 364/424.01, 424.07, 364/551.01, 449, 555, 564; 111/903, 904, 905, 127, 129, 149, 200, 82, 120, 177, 917, 37, 78, 185; 377/55, 6, 24, 24.1, 45; 340/609, 684, 539, 674, 520; 221/211, 150 A, 278; 222/266–305, 471, 502, 537

[56] References Cited

U.S. PATENT DOCUMENTS

| | | | |
|---|---|---|---|
| 3,912,121 | 10/1975 | Steffen | 221/13 |
| 3,928,751 | 12/1975 | Fathauer | 111/903 |
| 4,085,862 | 4/1978 | Steffen | 221/8 |
| 4,122,974 | 10/1978 | Harbert et al. | 221/13 |
| 4,149,163 | 4/1979 | Fathauer | 340/684 |
| 4,246,469 | 1/1981 | Merlo | 377/55 |
| 4,277,833 | 7/1981 | Steffen | 364/555 |
| 4,333,096 | 6/1982 | Jenkins et al. | 340/684 |
| 5,220,876 | 6/1993 | Monson et al. | 111/130 |
| 5,233,357 | 8/1993 | Ingensand et al. | 342/352 |
| 5,260,875 | 11/1993 | Tofte et al. | 364/424.07 |
| 5,392,707 | 2/1995 | Romans | 111/185 |
| 5,542,364 | 8/1996 | Romans | 111/185 |

OTHER PUBLICATIONS

Accu–Plant: Population Control . . . on the go Jan. 1994.

*Primary Examiner*—Kevin J. Teska
*Assistant Examiner*—Jacques Louis-Jacques
*Attorney, Agent, or Firm*—Hugh D. Jaeger

[57] ABSTRACT

A global positioning planter system for planting of seeds by a seed planter. A population control controls the seed planter. A global positioning system computer with digitized maps connects to the population control. The population control connects to the seeder for planting of seeds such as corn or beans or to seed drills for controlling the seed drill, and plants the seeds according to the population control which receives and transmits data with the global positioning system computer.

3 Claims, 9 Drawing Sheets

FIG. 7

GLOBAL POSITIONING PLANTER SYSTEM

CROSS REFERENCES TO CO-PENDING APPLICATIONS

None.

BACKGROUND OF THE INVENTION

1. Field of the Invention—The present invention pertains to either a seed planter or a seed drill, and more particularly, pertains to a seed planter or seed drill controlled by a population control which connects to a global positioning system and ground speed radar.

2. Description of the Prior Art—There has never been an accurate method to control the planting of seeds for a particular terrain or vary the planting of seeds for a particular terrain without stopping the planting process such as getting off the tractor, going back to the planter, and making the appropriate manual adjustments.

With the advent of solid state electronics, it has been possible to control some planting functions from the tractor although it is difficult sometimes for a farmer to drive the tractor and control the planting variables short of stopping the tractor.

The present invention overcomes the disadvantages of the prior art by providing a global positioning system which stores digitized maps, the particulars for the planting of seeds, and a population control which also controls the seed planter with the global positioning system and the ground.

SUMMARY OF THE INVENTION

The general purpose of the present invention is a global positioning planter system which controls a planter and matches the planting population to the particular soil type. As examples of the present invention and not to be construed as limiting the present invention, beans, corn and milo can be planted by the system.

According to one embodiment of the present invention, there is provided a global positioning planter system, including a population control which connects between a global positioning system receiver equipped with an external computer and a population control such as Accu-Plant sold by Rawson Controls Systems, Inc. of Oelwein, Iowa, the assignee of this patent application. The population control determines the change of the planting population rate for the seeds so that there is the appropriate planting rate information.

One significant aspect and feature of the present invention is a global positioning planter system which is readily useable by a farmer in the field and does not require the farmer to have a high technology background other than proper installation of the system and proper operation of the system. The system requires basic computer skills and does not require advanced computer skills or advanced programming skills.

Having thus described embodiments of the present invention, it is the principal object of the present invention to provide a global positioning planter system.

One object of the present invention is to provide a global positioning planter system utilizing a programmable population control with a global positioning system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
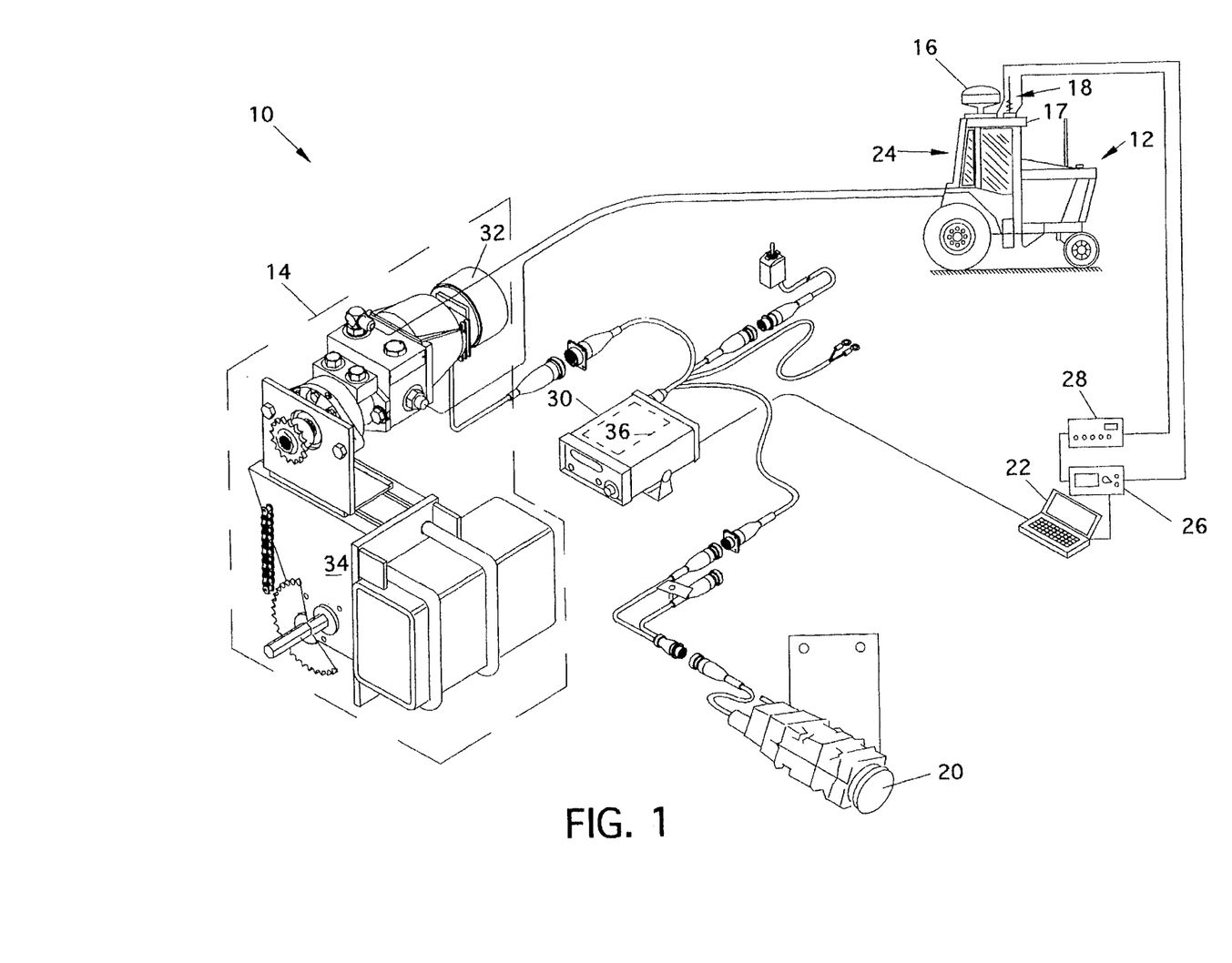
FIG. 1 illustrates a plan view of a global positioning planter system, the present invention.

FIG. 1 illustrates a perspective view of a global positioning planter system 10 including a tractor 12 and key components of a planter 14 illustrated within dashed lines. A GPS antenna 16 and a FM antenna 18 are positioned on a roof of the tractor 12, preferably on top of the tractor roof 17. A ground speed radar 20 positions preferably on a front or underside of the tractor 12. A computer 22 resides preferably inside a cab 24 of the tractor 12 for connection to a cab mounted GPS receiver 26 as well as an FM radio modem 28, and a population control 30. The FM radio 28 modem connects to the GPS receiver 26. The GPS antenna 16 connects to the GPS receiver 26. The FM antenna 18 connects to the FM modem 28. A population control 30 including a GPS planting board 36 connects to the computer 22. The population control 30 is Accu-Plant, as described in Appendix 1. A hydraulic servo drive 32 on a planter 14 represented by dashed lines connects to the population control 30. The output of the hydraulic servo drive 32 turns the seed dispensing assembly 34 in each of the planter heads. The hydraulic servo drive 32 is hydraulically powered by the tractor 12.

Figure 2:
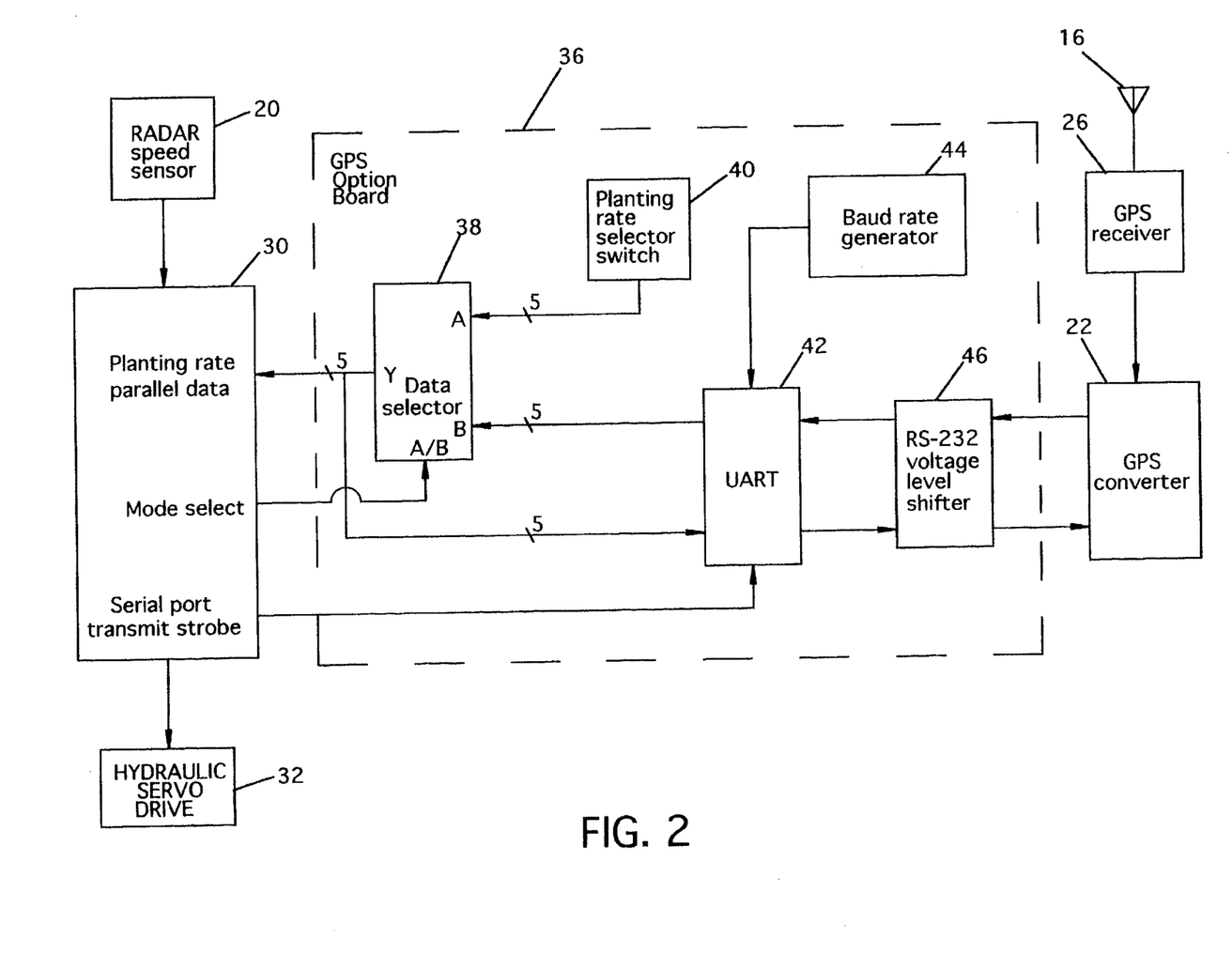
FIG. 2 illustrates a block diagram of the system.

FIG. 2 illustrates a block diagram where all numerals correspond to those elements previously described. A GPS planting board 36 connects in the population control 30. The data selector 38 is used to choose whether the planting rate is determined by the GPS computer 30 or the manually operated planting rate selector switch 40. The planting rate selector switch 40 is a manually operated position rotary switch. It may be used to select the planting rate used by the population control 30 when in non-GPS mode. The UART 42 (Universal Asynchronous Receiver Transmitter) converts the serial format data coming from the GPS computer 22 to the parallel format which is used by the population control 30 to select the planting rate. It also converts the parallel data supplied by the population control 30 into serial data for transmission to the GPS computer 22. The baud rate generator 44 controls the rate at which serial data is transmitted and received by the UART 42. The RS-232 voltage level shifter 46 converts the +/−12 volt voltage levels used by the EIA RS-232 standard serial port interface into the zero to five volt logic levels used by the UART 44 and other circuitry on the GPS planting board 36 and population control 30.

Figure 3:
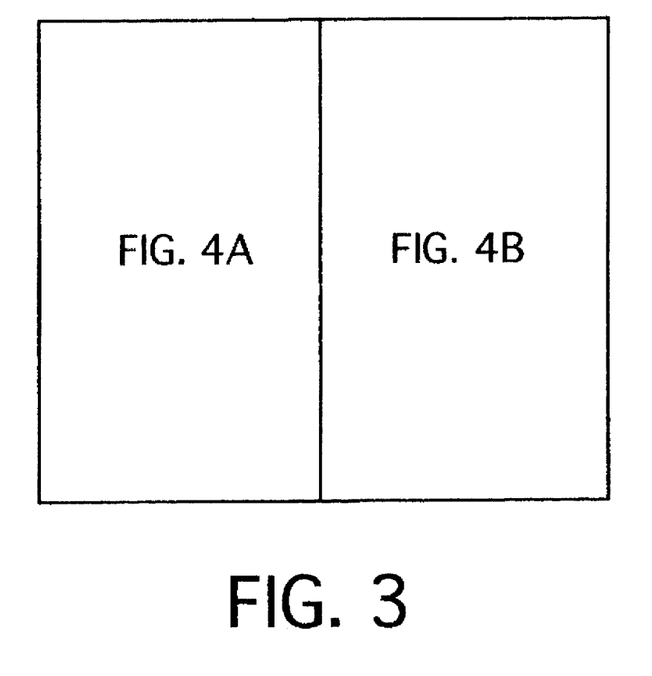
FIG. 3 illustrates the orientation of FIGS. 4A–4B.
Figure 4A:
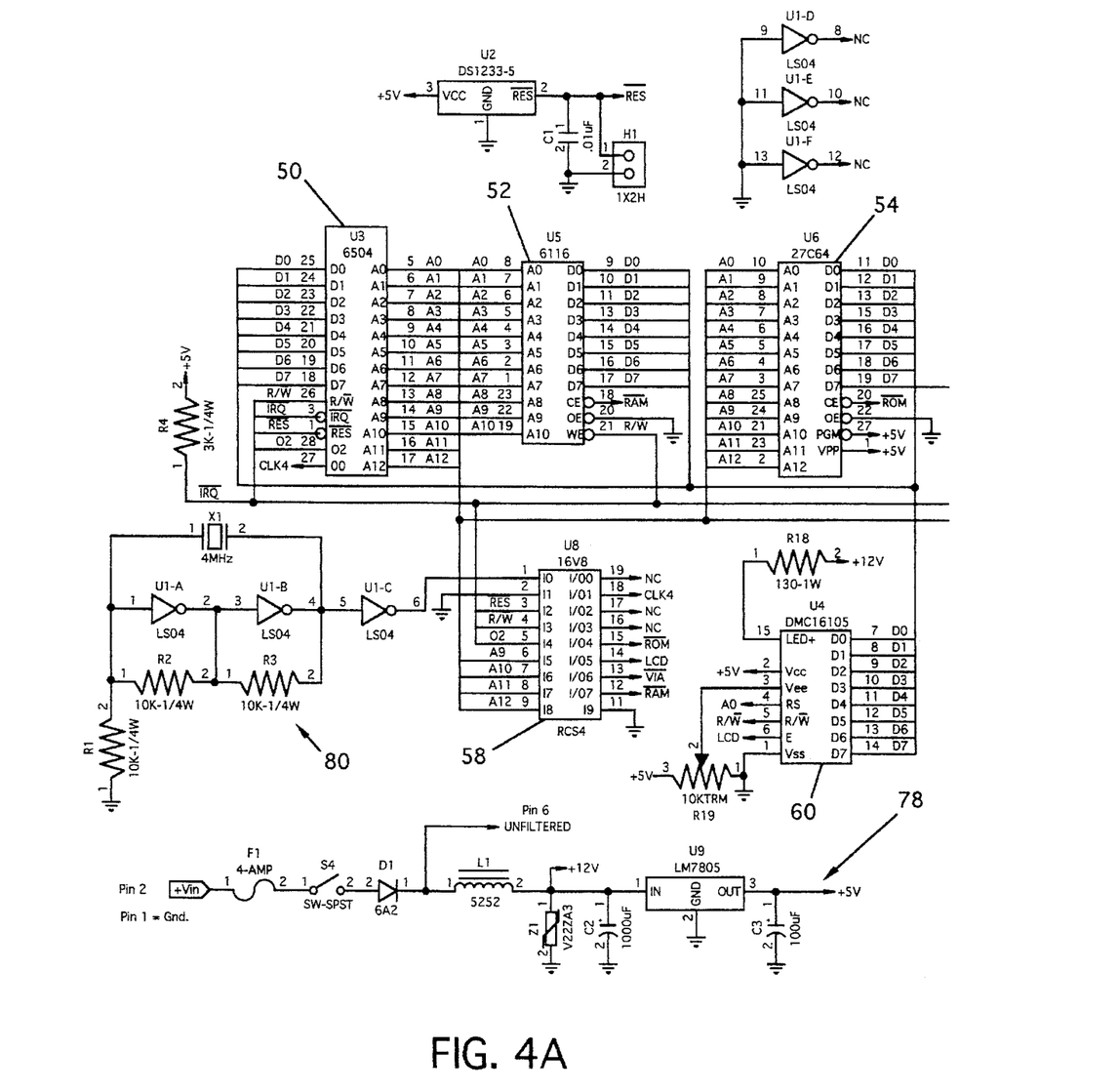
FIGS. 4A–4B illustrates an electric circuit schematic diagram of the population control.
Figure 4B:
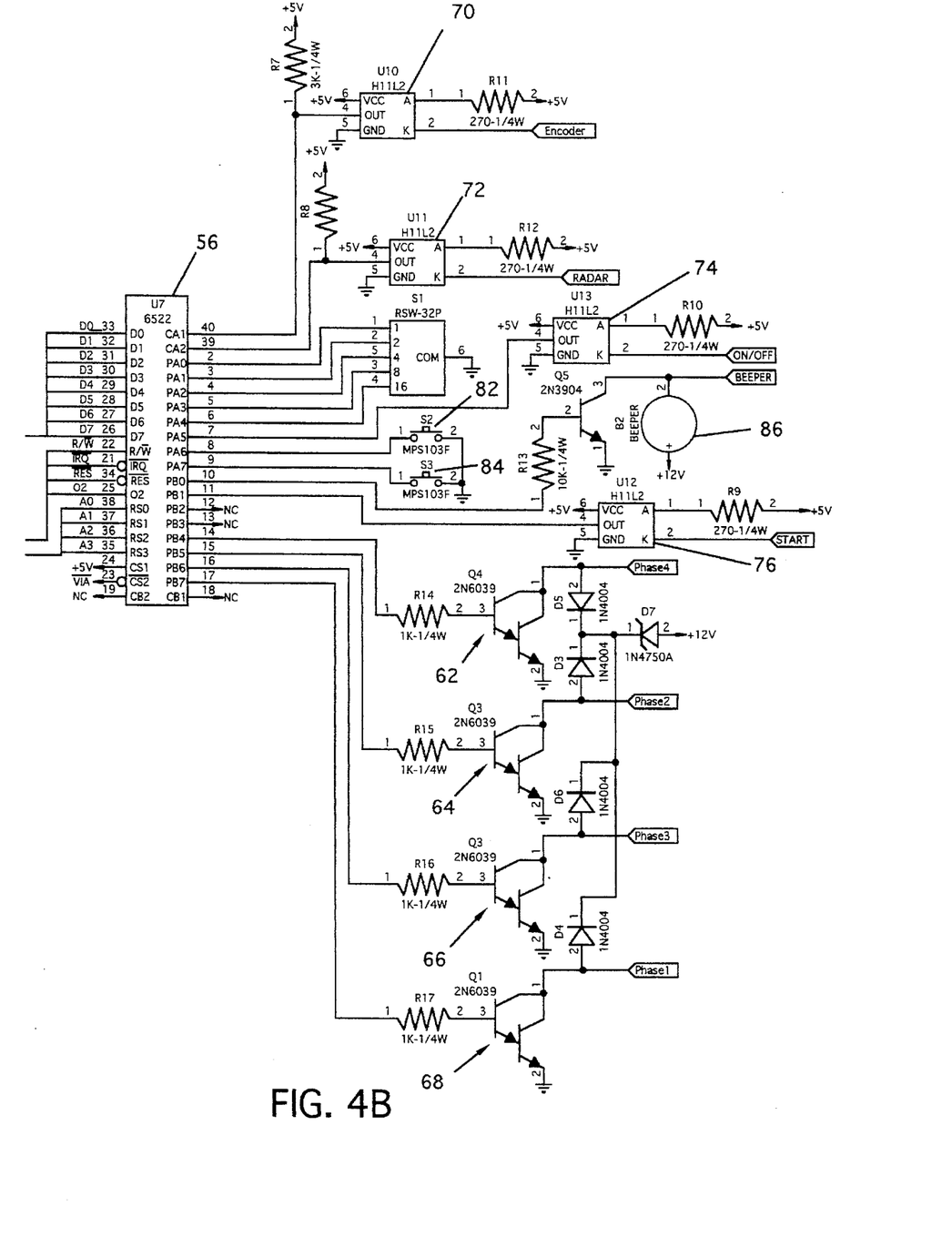

FIG. 3 illustrates the orientation of electrical circuit schematic diagrams FIGS. 4A–4B of the population control 30.

FIGS. 4A–4B illustrate an electrical circuit schematic diagram of the population control 30 where all numerals correspond to those elements previously described. Included are a microprocessor 50, RAM 52, an EPROM 54, an I/O 56, a programmable logic chip with glue logic 58, an LCD display 60, darlington pairs 62, 64, 66 and 68 for switching power to the stepper of the servo drive motor and photo-couplers 70, 72, 74 and 76. Also included are a switchable power supply 78, a clock 80, set switches 82 and 84, an audible beeper 86 and other associated components. The population control is for this described in Appendix 1.

Figure 5:
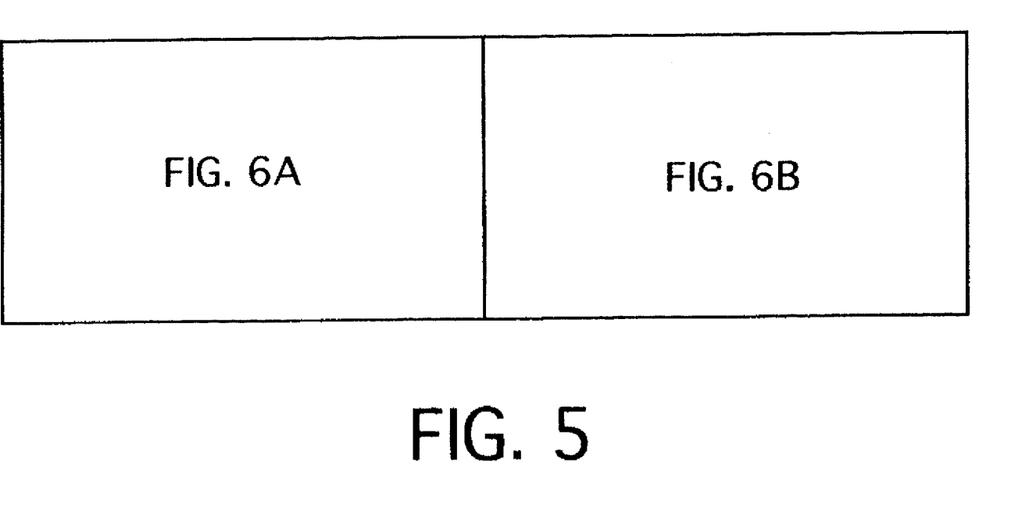
FIG. 5 illustrates the orientation of FIGS. 6A–6B.
Figure 6A:
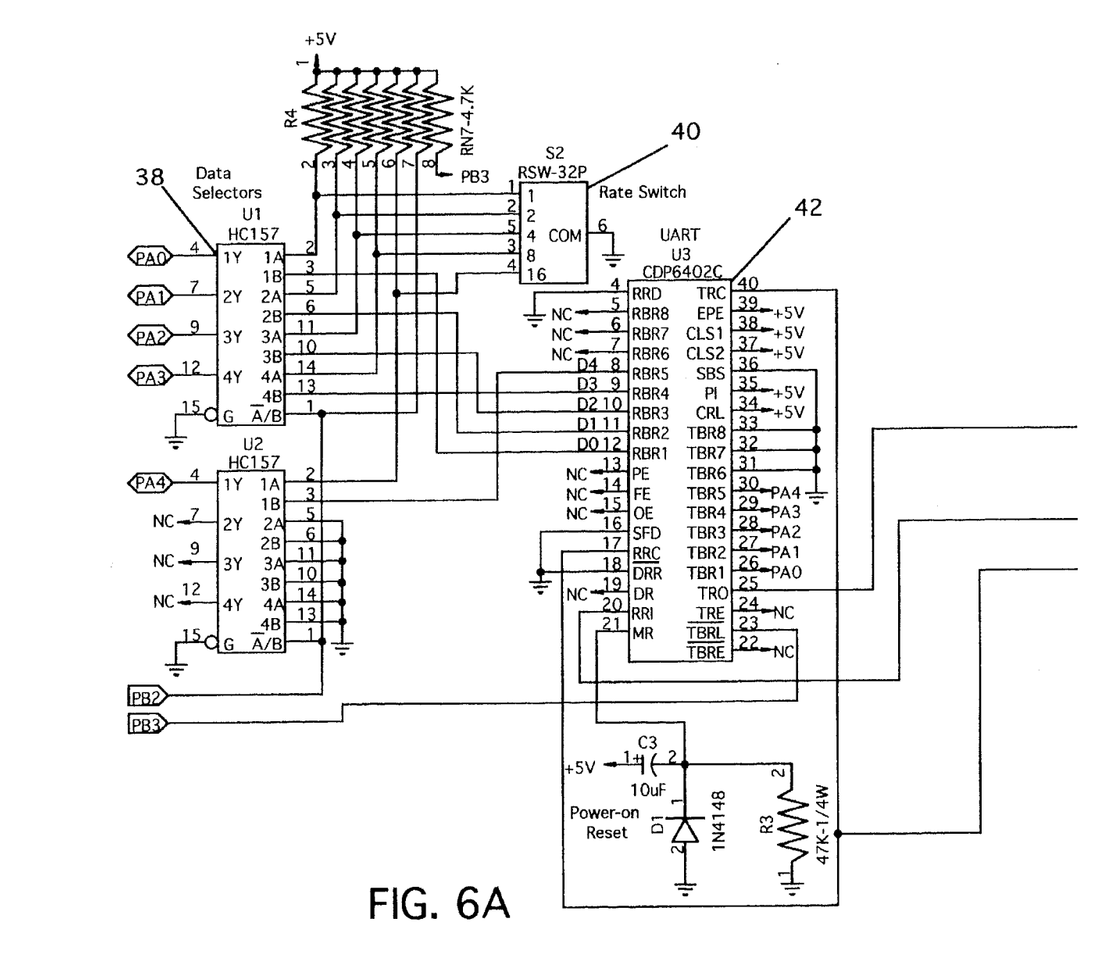
FIGS. 6A–6B illustrate an electronic circuit schematic diagram of the GPS planting board; and, FIG. 7 illustrates a flow chart of the present invention.
Figure 6B:
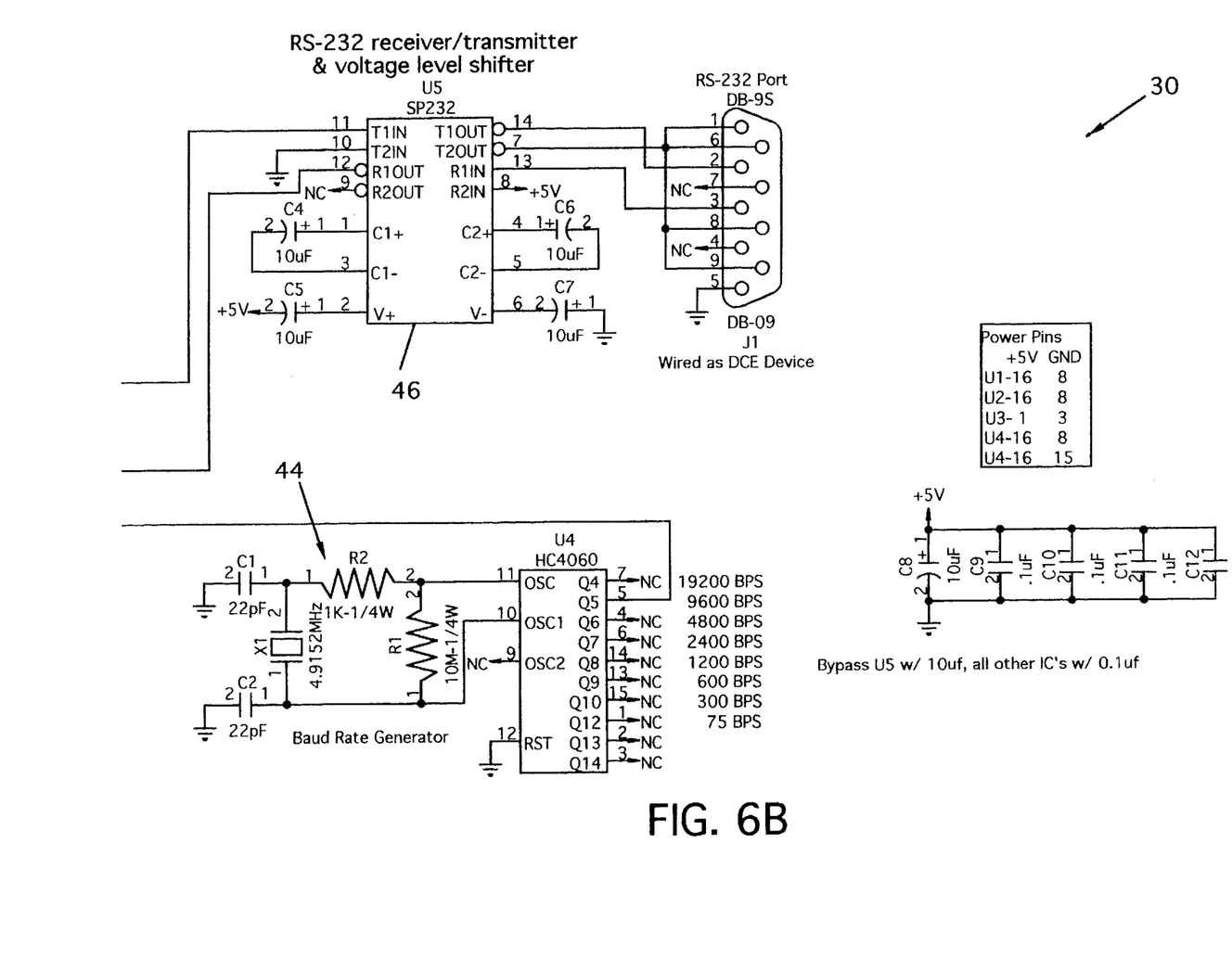

FIG. 5 illustrates the orientation of FIGS. 6A–6B.

FIGS. 6A–6B illustrate an electrical circuit schematic diagram of the GPS option planting board 36 where all numerals correspond to those elements previously described. The data selection 38 connects to the I/O 56.

MODE OF OPERATION

Figure 7:
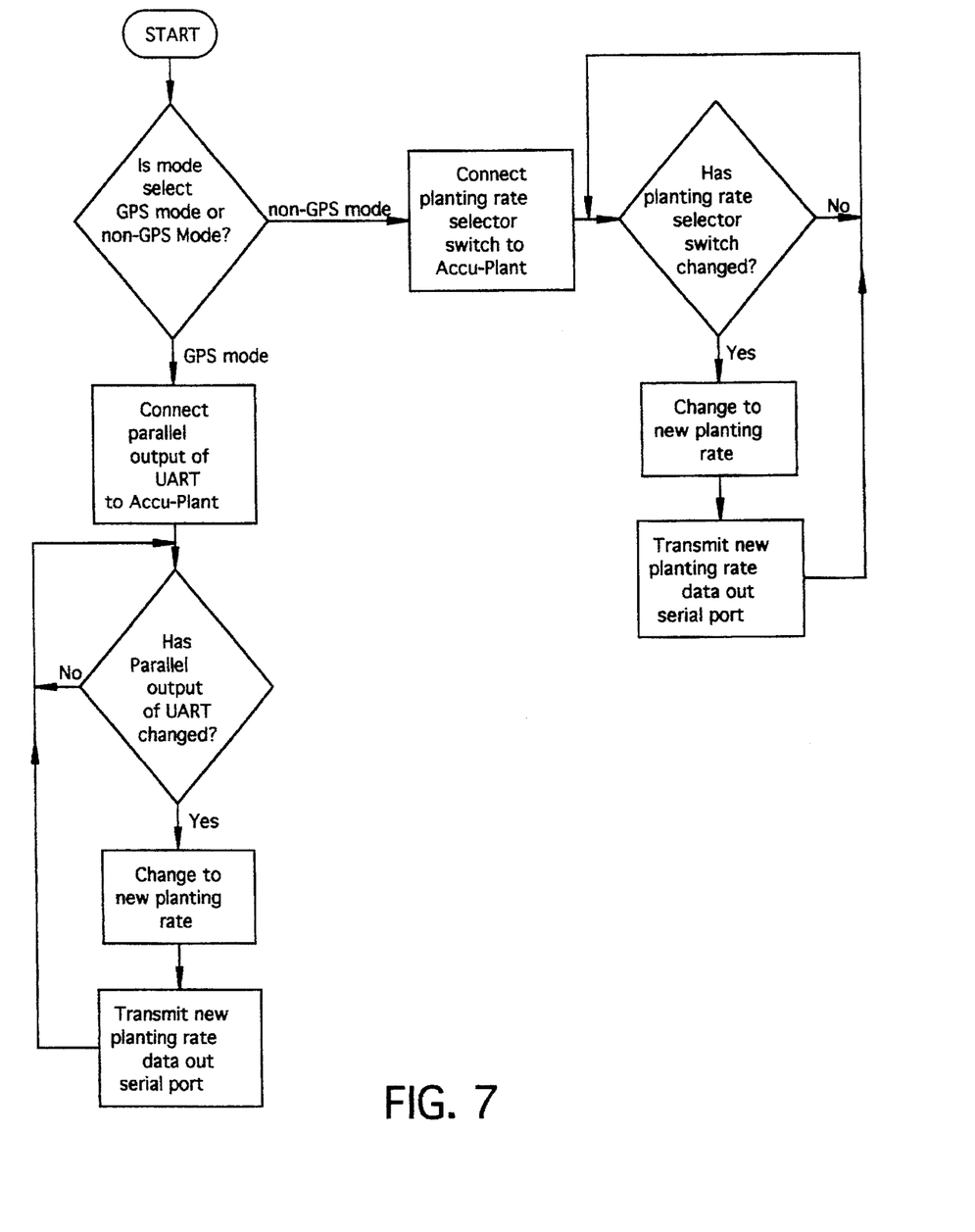

FIG. 7 illustrates a flow chart of the present invention and incorporates the subject matter of the software attached as Appendix 2.

The global positioning system planting board 36 is the interface between the population control 30, and a GPS receiver 26 and external computer 22. The computer 22 runs a program which displays a soil map of a farm field. Position data received from the GPS receiver 26 tells the map program where to place a cursor on the map showing the position in the field of the tractor and planter. As the tractor and planter move across the field, the continuous position information from the GPS receiver causes the cursor to move across the map. When the cursor crosses the boundary from one soil type to another, the GPS computer 22 sends an RS-232 serial data message to the GPS option planting board 36 which converts the serial signal to parallel format which the population control 36 uses to change the planting population rate. After the population control 30 changes the planting rate, it will signal the GPS option planting board 36 to send a serial data message back to the GPS computer verifying that the population control 30 correctly received the new planting rate information.

When accurate position information is not available from the GPS receiver 26, the population control 30 can be placed in non-GPS mode so that the planting rate may be changed by the operator by turning a front panel rotary switch on the population control 30. Each time the rotary switch is turned to a new planting rate, a serial message will be output by the GPS planting board so that the external computer 22 can tell that the planting rate has changed and make a record of the new rate.

Various modifications can be made to the present invention without departing from the apparent scope hereof.

We claim:

1. A system for planting seeds comprising:
   a. a tractor;
   b. a radar and a GPS means on said tractor;
   c. a seeder connected to said tractor having means for dispensing varying numbers of seeds per acre;
   d. a servo drive and a seed planter connected to said servo drive;
   e. a mapping computer connected to said GPS means;
   f. means connected to said mapping computer for storing digitalized maps containing information on numbers of seeds per acre for multiple mapped areas;
   g. a processor means connected to said means for storing digitalized maps; and,
   h. means connected to the processor means for indicating the number of seeds per acre to be planted for each mapped area, said means connected to said servo drive.

2. The system of claim 1 including an FM receiver connected to said GPS means.

3. A process for planting seeds comprising the steps of:
   a. connecting a variable seed number dispensing seeder having a servo drive and mounted on a planter to a tractor with a GPS and a radar;
   b. connecting a mapping computer to said GPS and storing digitalized maps in said mapping computer;
   c. connecting a seed processor to said mapping computer; and,
   d. inputting a number of seeds for a mapped area to said seed processor, storing said number of seeds for the mapped area in the mapping computer, and connecting said seed processor to said servo drive for planting predetermined number of seeds in a mapped area.

\* \* \* \* \*